(12) United States Patent
Champion (10) Patent No.: US 8,810,561 B2
(45) Date of Patent: Aug. 19, 2014

(54) DUAL LASER DRIVE METHOD. APPARATUS, AND SYSTEM

(75) Inventor: Mark Champion, Kenmore, WA (US)

(73) Assignee: Microvision, Inc., Redmond, WA (US)

( * ) Notice: Subject to any disclaimer, the term of this patent is extended or adjusted under 35 U.S.C. 154(b) by 655 days.

(21) Appl. No.: 13/099,231

(22) Filed: May 2, 2011

(65) Prior Publication Data

US 2012/0280972 A1 Nov. 8, 2012

(51) Int. Cl.
*G09G 5/00* (2006.01)
*G02B 27/10* (2006.01)
*G09G 3/02* (2006.01)
*G02B 27/48* (2006.01)
*H04N 9/31* (2006.01)
*G09G 3/20* (2006.01)
*G09G 5/02* (2006.01)
*G09G 5/10* (2006.01)

(52) U.S. Cl.
CPC .............. *G09G 3/025* (2013.01); *G02B 27/104* (2013.01); *G02B 27/48* (2013.01); *H04N 9/3129* (2013.01); *G09G 3/2081* (2013.01); *G09G 5/02* (2013.01); *G09G 5/10* (2013.01)
USPC ............................. 345/214; 345/204; 345/213

(58) Field of Classification Search
CPC . G09G 3/025; G09G 3/2081; G09G 2230/00; G09G 2320/00; G09G 2360/141
USPC ...................... 345/76, 84, 166, 204, 213, 545, 345/581–593, 690; 372/5, 20–27, 29.02, 372/38.02, 55–60, 67, 94; 348/E9.026, 348/E9.027; 353/29, 31, 122
See application file for complete search history.

(56) References Cited

U.S. PATENT DOCUMENTS

| | | | | |
|---|---|---|---|---|
| 5,764,403 A * | 6/1998 | Downing | ....................... | 359/326 |
| 6,108,081 A * | 8/2000 | Holtom et al. | ................ | 356/301 |
| 6,707,027 B2 * | 3/2004 | Liess et al. | ..................... | 250/221 |
| 7,296,897 B2 * | 11/2007 | Mooradian et al. | ............. | 353/31 |
| 7,701,412 B2 * | 4/2010 | Lee et al. | ......................... | 345/32 |
| 7,972,014 B2 * | 7/2011 | Hung et al. | ..................... | 353/69 |
| 8,255,040 B2 * | 8/2012 | Goldman et al. | ............. | 600/473 |
| 2002/0071122 A1 * | 6/2002 | Kulp et al. | ..................... | 356/437 |
| 2004/0101008 A1 * | 5/2004 | Kurtz et al. | ..................... | 372/39 |
| 2004/0130714 A1 * | 7/2004 | Gellerman et al. | ............ | 356/300 |
| 2004/0174348 A1 * | 9/2004 | David | ........................... | 345/204 |
| 2005/0147135 A1 * | 7/2005 | Kurtz et al. | ..................... | 372/23 |
| 2006/0033879 A1 * | 2/2006 | Covannon et al. | ............. | 351/221 |
| 2006/0132472 A1 * | 6/2006 | Peeters et al. | ................. | 345/204 |
| 2006/0132716 A1 * | 6/2006 | Peeters et al. | ..................... | 353/29 |
| 2009/0167726 A1 * | 7/2009 | Sprague et al. | ............... | 345/179 |
| 2010/0097534 A1 * | 4/2010 | Teller et al. | .................... | 348/756 |
| 2010/0098119 A1 * | 4/2010 | Schemmann et al. | .......... | 372/25 |
| 2011/0175861 A1 * | 7/2011 | Wakimoto et al. | ............. | 345/204 |
| 2011/0310357 A1 * | 12/2011 | Chiang | ........................... | 353/33 |
| 2012/0140784 A1 * | 6/2012 | Quirk et al. | .............. | 372/29.015 |
| 2012/0169777 A1 * | 7/2012 | Budni et al. | ................... | 345/690 |
| 2012/0170047 A1 * | 7/2012 | Hong et al. | .................... | 356/482 |

* cited by examiner

*Primary Examiner* — Prabodh M Dharia
(74) *Attorney, Agent, or Firm* — Kevin D. Wills (57) ABSTRACT

A scanning projector includes a scanning mirror that sweep a beam in two dimensions. The beam is created by multiple laser light sources, at least two of which create light at substantially the same wavelength. The two light sources at the same wavelength may be driven at different times, or may be driven simultaneously (equally or unequally).

11 Claims, 8 Drawing Sheets

DUAL LASER DRIVE METHOD. APPARATUS, AND SYSTEM

FIELD

The present invention relates generally to projection systems, and more specifically to scanning projection systems.

BACKGROUND

Laser light reflected off a surface sometimes exhibits a sparkling phenomenon referred to as "speckle." Laser light is spatially coherent, and when reflected off a diffuse surface, the reflected coherent light waves interfere with each other in a regular pattern that results in a user perceiving speckle. Scanning projectors that utilize lasers for light sources may exhibit speckle across a displayed image.

DESCRIPTION OF EMBODIMENTS

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

Figure 1:
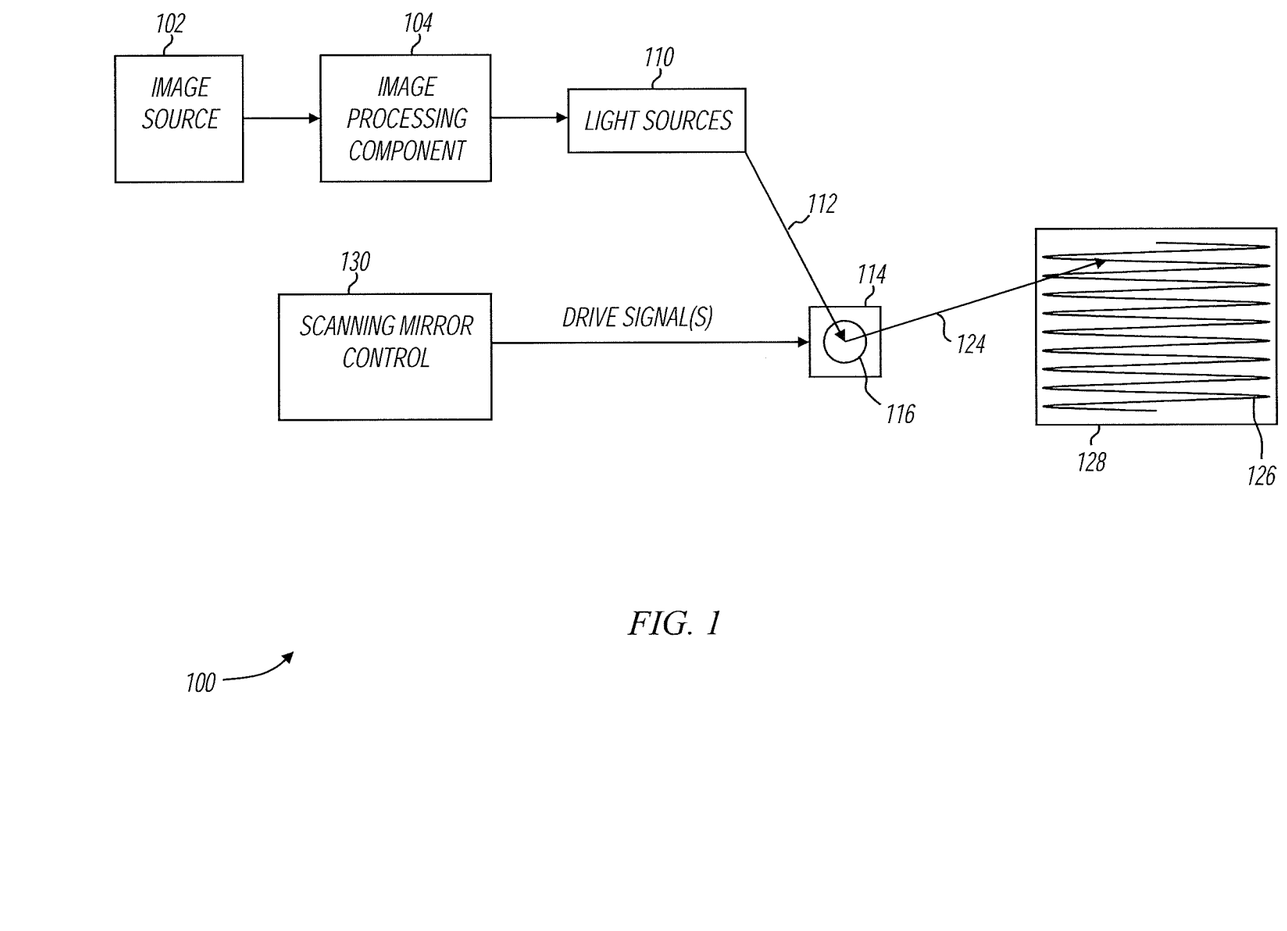
FIG. 1 shows a scanning projection apparatus in accordance with various embodiments of the present invention.

FIG. 1 shows a scanning projection apparatus in accordance with various embodiments of the present invention. As shown in FIG. 1, scanned beam projection system 100 includes a light source 110 that includes multiple laser light sources capable of emitting a beam 112. The beam 112 impinges on a scanning platform 114 which includes a microelectromechanical system (MEMS) based scanner or the like, and reflects off of scanning mirror 116 to generate a controlled output beam 124. A scanning mirror control circuit 130 provides one or more drive signal(s) to control the angular motion of scanning mirror 116 to cause output beam 124 to generate a raster scan 126 on a projection surface 128.

In some embodiments, raster scan 126 is formed by combining a sinusoidal component on the fast-scan axis (horizontal axis) and a sawtooth component on the slow-scan axis (vertical axis). In these embodiments, controlled output beam 124 sweeps back and forth left-to-right in a sinusoidal pattern, and sweeps vertically (top-to-bottom) in a sawtooth pattern with the display blanked during flyback (bottom-to-top). FIG. 1 shows the fast-scan sinusoidal pattern as the beam sweeps vertically top-to-bottom, but does not show the flyback from bottom-to-top.

One raster scan from top-to-bottom is referred to herein as one "frame." Pixels are painted along the raster scan in a frame as light sources 110 are modulated. Although the fast-scan axis is shown as the horizontal axis, and the slow-scan axis is shown as the vertical axis, the various embodiments of the present invention are not so limited. In some embodiments, the slow-scan axis is the horizontal axis and the fast scan axis is the vertical axis.

Image source 102 provides an image to be displayed to image processing component 104. Image source 102 may include any hardware or software that can provide an image. For example, image source 102 may be a storage medium such as a memory device or a hard disk. Also for example, image source 102 may be a processor that forms an image using software. In still further examples, image source 102 may be a connector or a communication medium that can receive communications that include an image to be displayed. The image provided to image processing component 104 may be static or may change over time. For example, the image source 102 may provide a video stream to image processing component 104.

Image processing component 104 receives an image from image source 102 and drives the laser light sources 110 with the correct timing and intensity so as to reproduce the image as beam 124 traverses raster pattern 126. In some embodiments, image processing component 104 drives multiple laser light sources that produce light of substantially the same wavelength. For example, laser light sources 110 may include two sources of green laser light, and image processing component 104 may drive them both to produce one pixel. Both green laser light sources may be driven equally or unequally and/or may be time multiplexed.

Using multiple sources of laser light of substantially the same wavelength can increase the available output power and also reduce speckle. When multiple sources of laser light of the same wavelength are driven at the same output power level, speckle is reduced to $$\frac{1}{\sqrt{n}},$$

where n is the number of laser light sources. Various embodiments of the present invention use multiple sources of laser light to increase output power as well as reduce speckle as described in more detail below.

Figure 2:
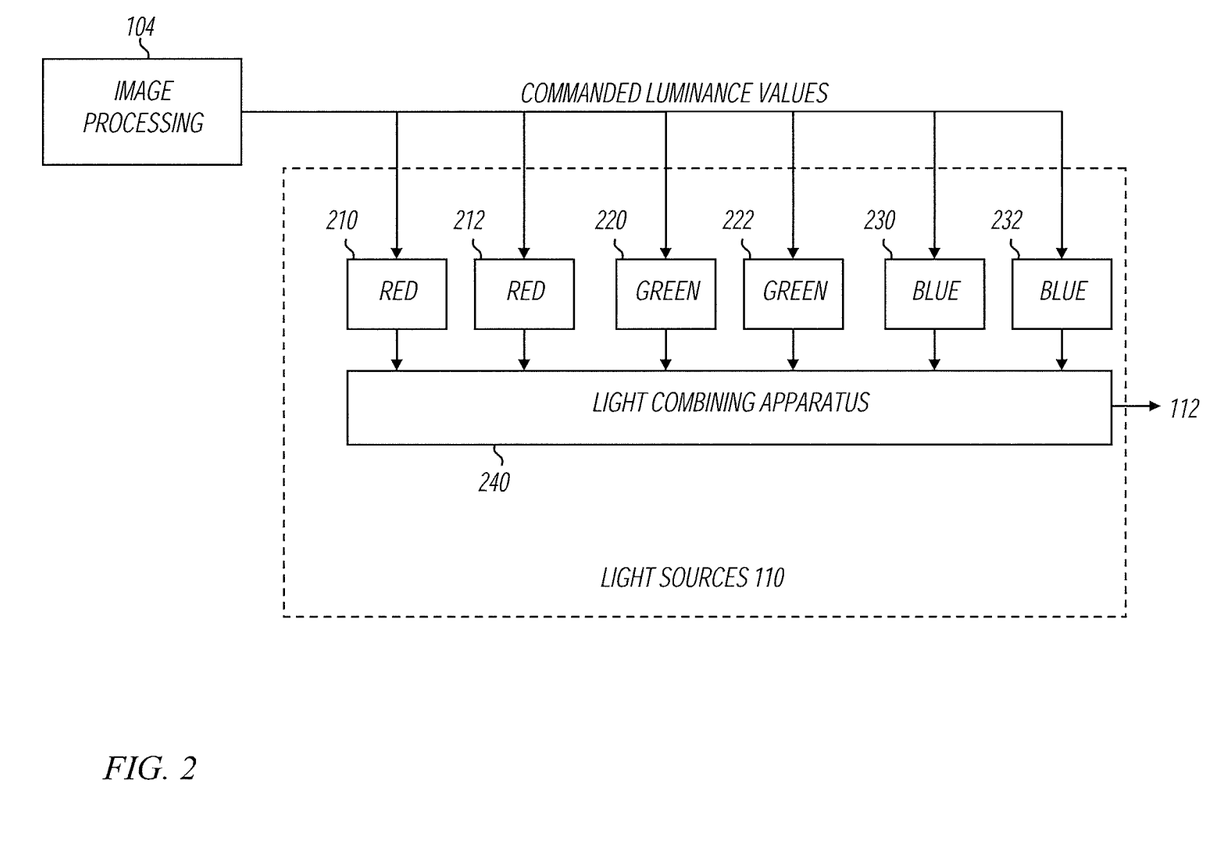
FIG. 2 shows multiple laser light sources that produce light of substantially the same wavelength.

FIG. 2 shows multiple laser light sources that produce light of substantially the same wavelength. As shown in FIG. 2, light sources 110 includes two red light sources 210, 212, two green light sources 220, 222, and two blue light sources 230 and 232. Each of the light sources 210, 212, 220, 222, 230, and 232 are driven with commanded luminance values by image processing component 104, and produce light in response thereto. For example, red light sources 210 and 212 produce red laser light in response to commanded luminance values received from image processing component 104.

As used herein, the term "light of substantially the same wavelength" refers to light that is perceived to be the same color by a human eye. For example, green laser light sources 220 and 222 produce light of substantially the same wavelength. In some embodiments they may produce light of exactly the same wavelength (e.g., 525 nanometers) and in other embodiments, the wavelength of the light from the two source may vary while still being in the "green" spectrum (e.g., 520-570 nanometers). In both cases, the two sources produce light of substantially the same wavelength.

In operation, image processing component 104 produces commanded luminance values to drive the laser light sources when pixels are to be displayed. Image processing component 104 may include any suitable hardware and/or software useful to produce commanded drive values from video data. For example, image processing component 104 may include application specific integrated circuits (ASICs), one or more processors, or the like. In some embodiments, image processing component 104 determines the location of beam 124, and interpolates between pixels in a source image to determine luminance values for a pixel to be displayed on the raster pattern 126.

Image processing component 104 drives the multiple light sources in a manner that decreases speckle and/or increases available output power. For example, in some embodiments, two light sources of substantially the same wavelength are driven in sequence during one pixel time. During the time to display one pixel, green laser light source 220 may be driven for a first time period, and green light source 222 may be driven for a second time period. Also for example, both green laser light sources 220, 222 may be driven during the entire pixel time. They may be driven with equal power levels or different power levels. When driven with equal power levels, speckle can be reduced to 0.707

$$\left(\frac{1}{\sqrt{2}} \text{ with } n = 2\right),$$

and when driven with unequal power levels, efficiency may be increased. Further, in some embodiments, one green laser light source may be used to illuminate a particular pixel in one frame, and the other green laser light source may be used to illuminate the pixel in the next frame. Alternating laser light sources may reduce apparent speckle because the human eye averages information received over multiple frames. Further, alternating laser light sources from frame-to-frame may increase efficiency because efficiency is generally greater at larger power levels.

In some embodiments, the laser light sources include laser diodes that are driven with electrical current. In these embodiments, the commanded luminance values may be electrical currents. Further, in some embodiments, the light sources include digital-to-analog converters that receive digital commanded luminance values and drive laser diodes.

Light combining apparatus 240 receives light from the various light sources shown and creates a single collimated beam at 112. Light combining apparatus 240 may include any suitable optical components, such as mirrors and lenses.

Laser light sources 110 shows two red light sources, two green light sources, and two blue light sources, although this is not a limitation of the present invention. For example, in some embodiments, light sources 110 includes two green light sources, and one each of red and blue light sources. In other embodiments, light sources 110 includes only two red or only two blue light sources.

Figure 3:
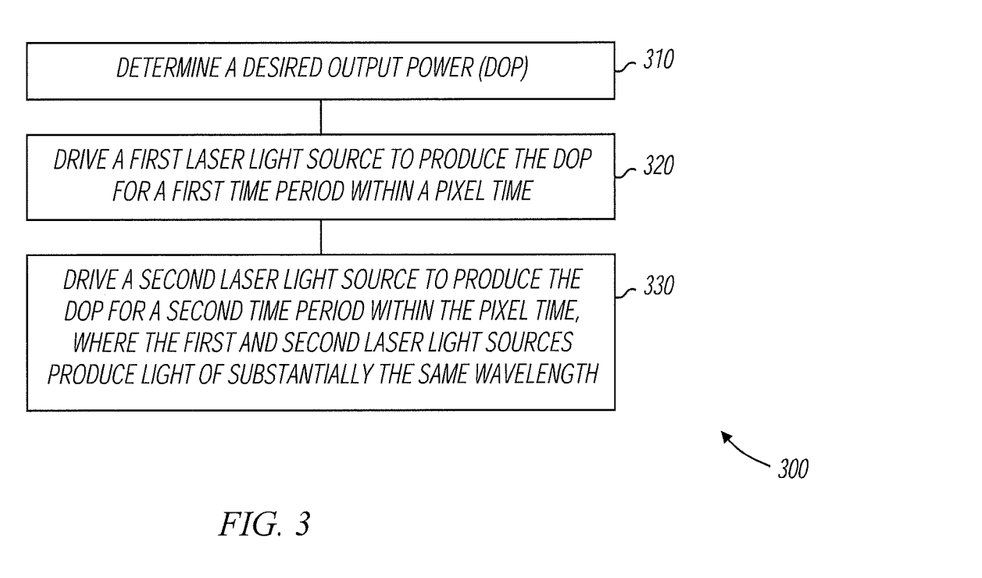
FIG. 3 shows a flowchart of a method for driving two laser light sources of the same wavelength during a pixel time.

FIG. 3 shows a flow diagram of methods in accordance with various embodiments of the present invention. In some embodiments, method 300, or portions thereof, is performed by a scanning projection apparatus, embodiments of which are shown in previous figures. In other embodiments, method 300 is performed by a series of circuits or an electronic system. Method 300 is not limited by the particular type of apparatus performing the method. The various actions in method 300 may be performed in the order presented, or may be performed in a different order. Further, in some embodiments, some actions listed in FIG. 3 are omitted from method 300.

Method 300 is shown beginning with block 310 in which a desired output power (DOP) is determined. In some embodiments, this corresponds to image processing component 104 determining the desired output power for each color of a display pixel. For example, image processing component 104 may interpolate between pixels in a source image to determine the desired output power for each or red, green, and blue light sources for a display pixel. A "display pixel" is a pixel that is illuminated on raster scan 126 when the light sources are modulated. This is in contrast to an "image pixel" or "source image pixel" which is a pixel in a source image (usually on a rectilinear grid). The term "pixel time" as herein refers to the time duration that laser light sources are turned on to illuminate one display pixel.

At 320, a first laser light source is driven to produce the DOP for a first time period within a pixel time. This is shown diagrammatically in FIG. 4 at 410. At 330, a second laser light source is driven to produce the DOP for a second time period within the pixel time, where the first and second laser light sources produce light of substantially the same wavelength. This is shown diagrammatically in FIG. 4 at 420.

Figure 4:
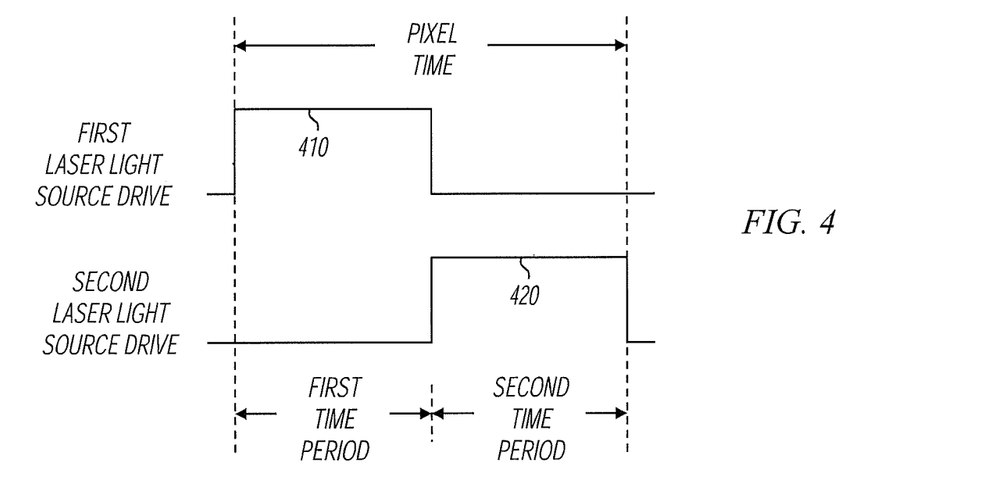
FIG. 4 shows waveforms representing two laser light sources of the same wavelength being driven during one pixel time.

The first and second light sources referred to in FIGS. 3 and 4 may correspond to sources of light at any wavelength. For example, the first light source may be red light source 210 and the second light source may be red light source 212. Also for example, the first light source may be green light source 220 and the second light source may be green light source 222. Also for example, the first light source may be blue light source 230 and the second light source may be blue light source 232.

Alternating light sources of substantially the same wavelength reduces speckle as perceived by the human eye, and may increase efficiency as compared to driving two light sources simultaneously with the same power level. For example, alternately driving two light sources at full power is generally more efficient than simultaneously driving two light sources at half power.

Figure 5:
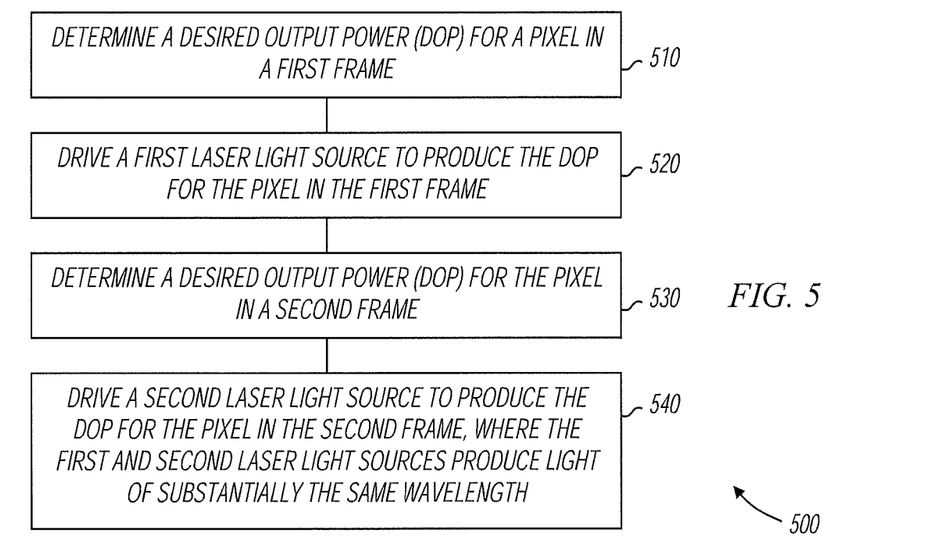
FIG. 5 shows a flowchart of a method for driving two laser light sources of the same wavelength during alternate frames.

FIG. 5 shows a flow diagram of methods in accordance with various embodiments of the present invention. In some embodiments, method 500, or portions thereof, is performed by a scanning projection apparatus, embodiments of which are shown in previous figures. In other embodiments, method 500 is performed by a series of circuits or an electronic system. Method 500 is not limited by the particular type of apparatus performing the method. The various actions in method 500 may be performed in the order presented, or may be performed in a different order. Further, in some embodiments, some actions listed in FIG. 5 are omitted from method 500.

Method 500 is shown beginning with block 510 in which a desired output power (DOP) is determined for a display pixel in a first frame. In some embodiments, this corresponds to image processing component 104 determining the desired output power for each color of a display pixel. For example, image processing component 104 may interpolate between pixels in a source image to determine the desired output power for each or red, green, and blue light sources for a display pixel. At 520, a first laser light source is driven to produce the DOP for the pixel in the first frame.

At 530 a desired output power (DOP) is determined for the display pixel in a second frame. In some embodiments, this corresponds to image processing component 104 determining the desired output power for each color of the same display pixel as in 510. For example, image processing component 104 may interpolate between pixels in the source image to determine the desired output power for each or red, green, and blue light sources for a display pixel. Depending on the relative frame rates of the source image and raster scan 126, the interpolation may interpolate between the same source image pixels or different source image pixels. At 540, a second laser light source is driven to produce the DOP for the pixel in the second frame, where the first and second laser light sources produce light of substantially the same wavelength.

The first and second light sources referred to in FIG. 5 may correspond to sources of light at any wavelength. For example, the first light source may be red light source 210 and the second light source may be red light source 212. Also for example, the first light source may be green light source 220 and the second light source may be green light source 222. Also for example, the first light source may be blue light source 230 and the second light source may be blue light source 232.

Alternating laser light sources of substantially the same wavelength from frame-to-frame reduces speckle as perceived by the human eye, and may increase efficiency as compared to driving two light sources simultaneously with the same power level. For example, alternately driving two light sources at full power is generally more efficient than simultaneously driving two light sources at half power.

Figure 6:
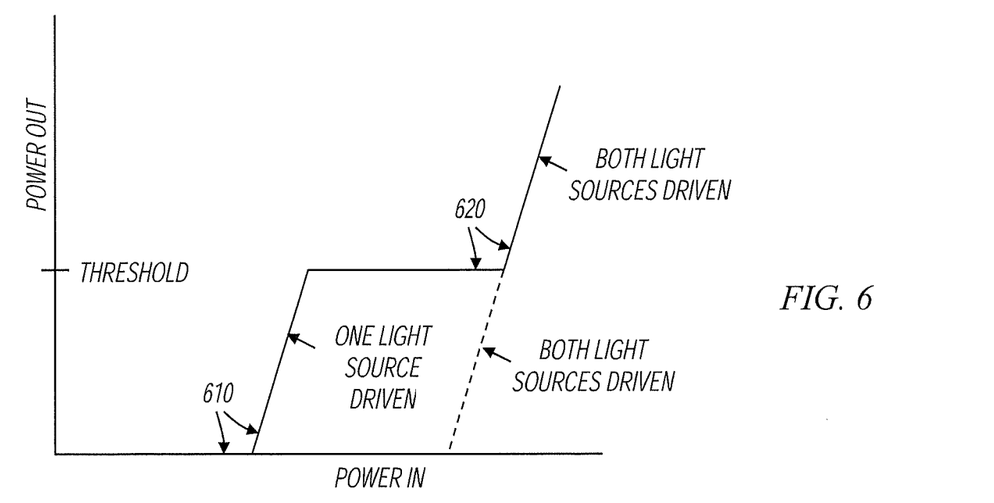
FIG. 6 shows characteristic waveforms for two laser diodes.

FIG. 6 shows characteristic waveforms for two laser diodes. A first laser diode characteristic is shown at 610, and a second laser diode characteristic is shown at 620. For desired output powers below the threshold, one or both laser diodes can be driven, and for desired output powers above the threshold, both laser diodes can be driven.

As can be seen in FIG. 6, for desired output power levels below the threshold, the efficiency (output power for any given input power) is greater when driving one laser diode rather than two. However, as describe above, maximum speckle reduction is achieved when the laser diodes are driven equally. Various embodiments of the present invention alternate the drive of two laser diodes to achieve high efficiency and apparent speckle reduction.

Figure 7:
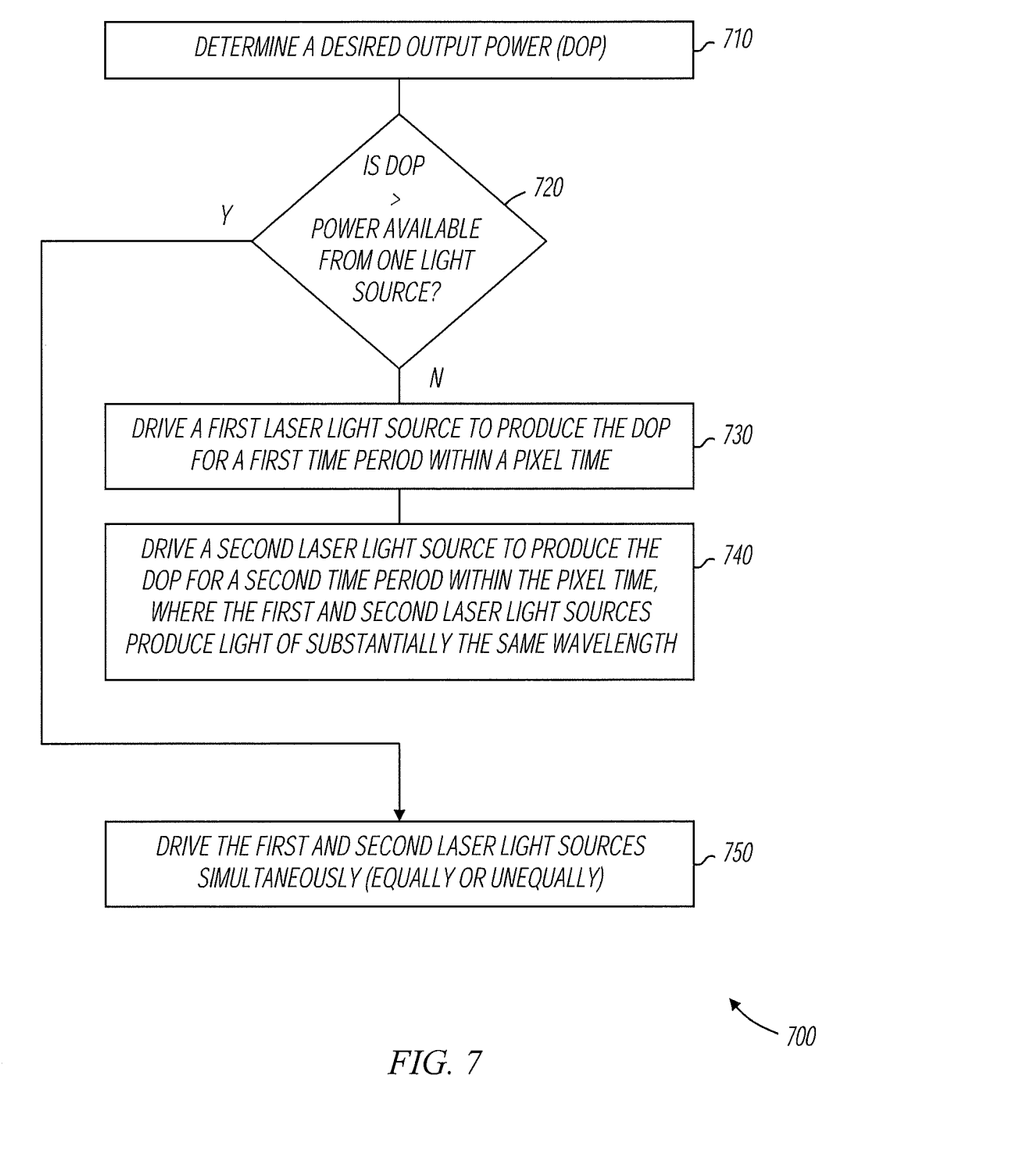
FIG. 7 shows a flowchart of a method for driving two laser light sources of the same wavelength to achieve greater output power.

FIG. 7 shows a flow diagram of methods in accordance with various embodiments of the present invention. In some embodiments, method 700, or portions thereof, is performed by a scanning projection apparatus, embodiments of which are shown in previous figures. In other embodiments, method 700 is performed by a series of circuits or an electronic system. Method 700 is not limited by the particular type of apparatus performing the method. The various actions in method 700 may be performed in the order presented, or may be performed in a different order. Further, in some embodiments, some actions listed in FIG. 7 are omitted from method 700.

Method 700 is shown beginning with block 710 in which a desired output power (DOP) is determined for a display. In some embodiments, this corresponds to image processing component 104 determining the desired output power for each color of a display pixel. For example, image processing component 104 may interpolate between pixels in a source image to determine the desired output power for each or red, green, and blue light sources for a display pixel. At 720, the DOP is compared to a threshold (see FIG. 6) to determine whether the DOP is greater than the power available from one light source. If the DOP is not greater than that available from one light source, then a first laser light source is driven to produce the DOP for a first time period within a pixel at 730, and a second laser light source is driven to produce the DOP for a second time period within the pixel at 740. This is shown in FIG. 4.

If the DOP is greater than that available from a single light source, then two light sources are driven simultaneously at 750. The two light sources driven simultaneously at 750 may be driven equally or unequally. Examples of equal drive and unequal drive are shown in FIGS. 8 and 9.

Figure 8:
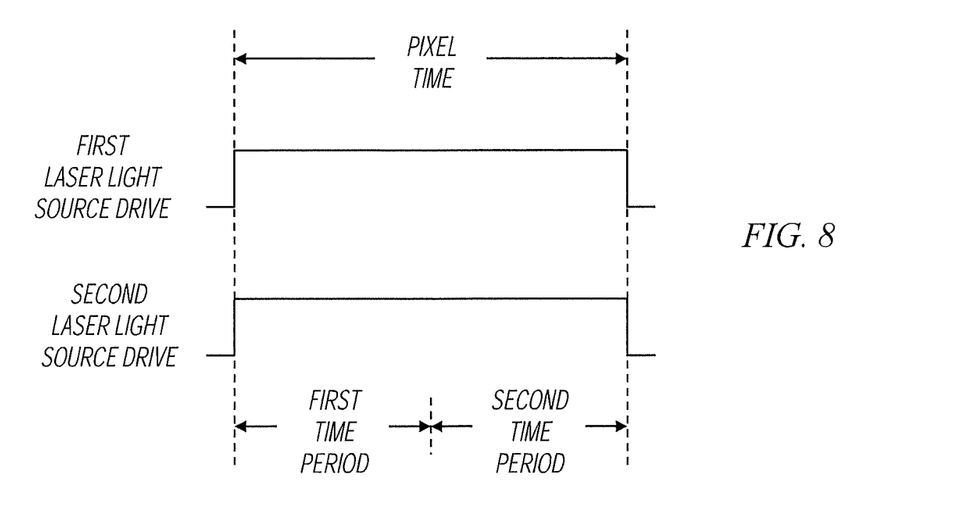
FIGS. 8 and 9 show waveforms representing two laser light sources of the same wavelength being driven during one pixel time.
Figure 9:
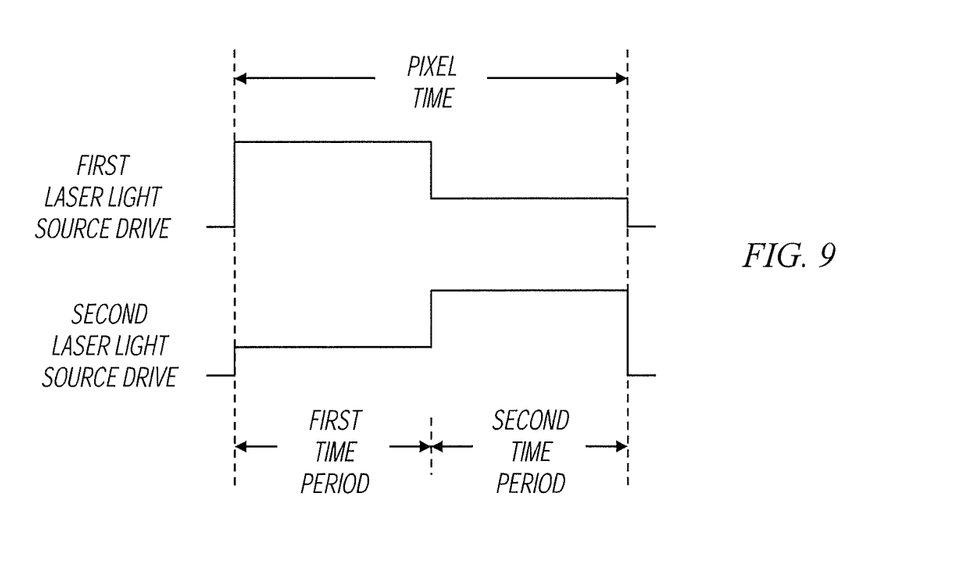

FIGS. 8 and 9 show waveforms representing two laser light sources of the same wavelength being driven during one pixel time. As shown in FIG. 8, two laser light sources may be driven equally for the entire pixel time. This reduces speckle to 0.707

$$\left(\frac{1}{\sqrt{2}} \text{ with } n = 2\right).$$

As shown in FIG. 9, two laser light sources are driven simultaneously, but at different power levels. The pixel time is divided into two time periods, and during the first time period, the first laser light source is driven harder than the second laser light source. During the second time period, the roles of the laser light sources are reversed, with the second laser light source being driven harder than the first.

In some embodiments, the roles of the first and second laser diodes are swapped for alternate frames. For example, the first laser light source may be driven harder than the second laser light source for the entire pixel time in one frame, and then the second laser light source may be driven harder than the first laser light source in the next frame. This may occur for laser diodes of substantially the same wavelength, or for all laser diodes in a projection apparatus.

Figure 10:
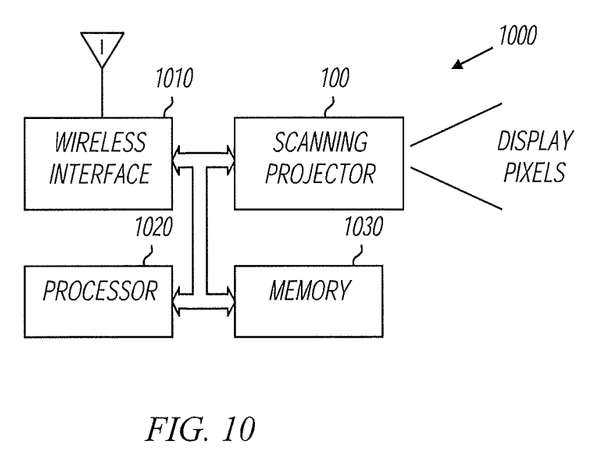
FIG. 10 shows a block diagram of a mobile device in accordance with various embodiments of the present invention.

FIG. 10 shows a block diagram of a mobile device in accordance with various embodiments of the present invention. As shown in FIG. 10, mobile device 1000 includes wireless interface 1010, processor 1020, memory 1030, and scanning projector 100. Scanning projector 100 is described with reference to previous figures. In some embodiments, scanning projector 100 includes multiple laser light sources for producing light at substantially the same wavelength for reducing speckle and increasing efficiency as described above.

Scanning projector 100 may receive image data from any image source. For example, in some embodiments, scanning projector 100 includes memory that holds still images. In other embodiments, scanning projector 100 includes memory that includes video images. In still further embodiments, scanning projector 100 displays imagery received from external sources such as connectors, wireless interface 1010, or the like.

Wireless interface 1010 may include any wireless transmission and/or reception capabilities. For example, in some embodiments, wireless interface 1010 includes a network interface card (NIC) capable of communicating over a wireless network. Also for example, in some embodiments, wireless interface 1010 may include cellular telephone capabilities. In still further embodiments, wireless interface 1010 may include a global positioning system (GPS) receiver. One skilled in the art will understand that wireless interface 1010 may include any type of wireless communications capability without departing from the scope of the present invention.

Processor 1020 may be any type of processor capable of communicating with the various components in mobile device 1000. For example, processor 1020 may be an embedded processor available from application specific integrated circuit (ASIC) vendors, or may be a commercially available microprocessor. In some embodiments, processor 1020 provides image or video data to scanning projector 100. The image or video data may be retrieved from wireless interface 1010 or may be derived from data retrieved from wireless interface 1010. For example, through processor 1020, scanning projector 100 may display images or video received directly from wireless interface 1010. Also for example, processor 1020 may provide overlays to add to images and/or video received from wireless interface 1010, or may alter stored imagery based on data received from wireless interface 1010 (e.g., modifying a map display in GPS embodiments in which wireless interface 1010 provides location coordinates).

Figure 11:
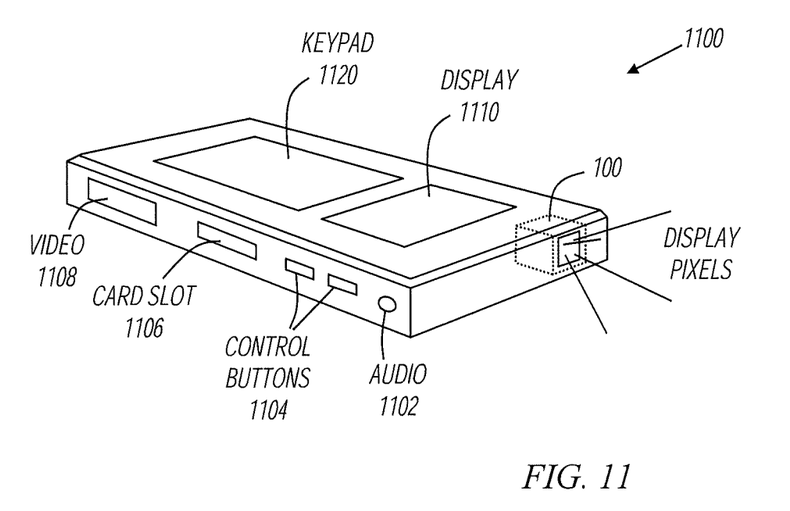
FIG. 11 shows a mobile device in accordance with various embodiments of the present invention.

FIG. 11 shows a mobile device in accordance with various embodiments of the present invention. Mobile device 1100 may be a hand held projection device with or without communications ability. For example, in some embodiments, mobile device 1100 may be a handheld projector with little or no other capabilities. Also for example, in some embodiments, mobile device 1100 may be a device usable for communications, including for example, a cellular phone, a smart phone, a personal digital assistant (PDA), a global positioning system (GPS) receiver, or the like. Further, mobile device 1100 may be connected to a larger network via a wireless (e.g., WiMax) or cellular connection, or this device can accept data messages or video content via an unregulated spectrum (e.g., WiFi) connection.

Mobile device 1100 includes scanning projector 100 to create an image from display pixels as shown in FIG. 11. Mobile device 1100 also includes many other types of circuitry; however, they are intentionally omitted from FIG. 11 for clarity.

Mobile device 1100 includes display 1110, keypad 1120, audio port 1102, control buttons 1104, card slot 1106, and audio/video (A/V) port 1108. None of these elements are essential. For example, mobile device 1100 may only include scanning projector 100 without any of display 1110, keypad 1120, audio port 1102, control buttons 1104, card slot 1106, or A/V port 1108. Some embodiments include a subset of these elements. For example, an accessory projector product may include scanning projector 100, control buttons 1104 and A/V port 1108.

Display 1110 may be any type of display. For example, in some embodiments, display 1110 includes a liquid crystal display (LCD) screen. Display 1110 may always display the same content as that projected or different content. For example, an accessory projector product may always display the same content, whereas a mobile phone embodiment may project one type of content while displaying different content on display 1110. Keypad 1120 may be a phone keypad or any other type of keypad.

A/V port 1108 accepts and/or transmits video and/or audio signals. For example, A/V port 1108 may be a digital port that accepts a cable suitable to carry digital audio and video data. Further, A/V port 1108 may include RCA jacks to accept composite inputs. Still further, A/V port 1108 may include a VGA connector to accept analog video signals. In some embodiments, mobile device 1100 may be tethered to an external signal source through A/V port 1108, and mobile device 1100 may project content accepted through A/V port 1108. In other embodiments, mobile device 1100 may be an originator of content, and A/V port 1108 is used to transmit content to a different device.

Audio port 1102 provides audio signals. For example, in some embodiments, mobile device 1100 is a media player that can store and play audio and video. In these embodiments, the video may be projected and the audio may be output at audio port 1102. In other embodiments, mobile device 1100 may be an accessory projector that receives audio and video at A/V port 1108. In these embodiments, mobile device 1100 may project the video content, and output the audio content at audio port 1102.

Mobile device 1100 also includes card slot 1106. In some embodiments, a memory card inserted in card slot 1106 may provide a source for audio to be output at audio port 1102 and/or video data to be projected. Card slot 1106 may receive any type of solid state memory device, including for example, Multimedia Memory Cards (MMCs), Memory Stick DUOS, secure digital (SD) memory cards, and Smart Media cards. The foregoing list is meant to be exemplary, and not exhaustive.

Figure 12:
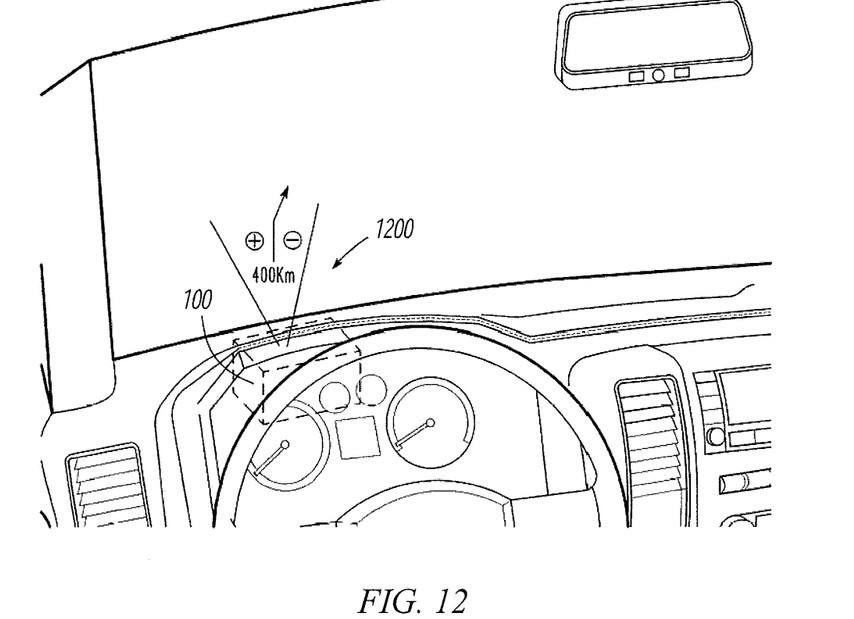
FIG. 12 shows a head-up display system in accordance with various embodiments of the invention.

FIG. 12 shows a head-up display system in accordance with various embodiments of the invention. Projector 100 is shown mounted in a vehicle dash to project the head-up display at 1200. Although an automotive head-up display is shown in FIG. 12, this is not a limitation of the present invention. For example, various embodiments of the invention include head-up displays in avionics application, air traffic control applications, and other applications.

Figure 13:
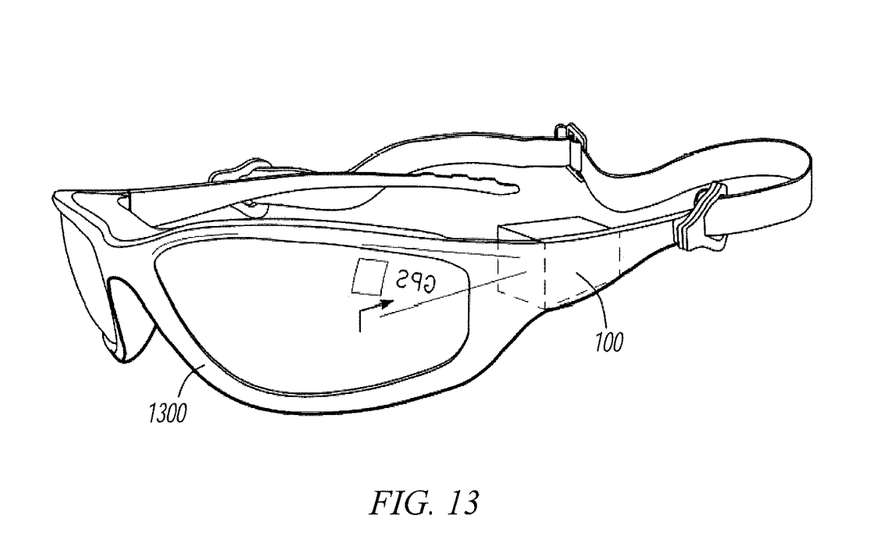
FIG. 13 shows eyewear in accordance with various embodiments of the invention.

FIG. 13 shows eyewear in accordance with various embodiments of the invention. Eyewear 1300 includes projector 100 to project a display in the eyewear's field of view. In some embodiments, eyewear 1300 is see-through and in other embodiments, eyewear 1300 is opaque. For example, eyewear may be used in an augmented reality application in which a wearer can see the display from projector 100 overlaid on the physical world. Also for example, eyewear may be used in a virtual reality application, in which a wearer's entire view is generated by projector 100. Although only one projector 100 is shown in FIG. 13, this is not a limitation of the present invention. For example, in some embodiments, eyewear 1300 includes two projectors; one for each eye.

Although the present invention has been described in conjunction with certain embodiments, it is to be understood that modifications and variations may be resorted to without departing from the scope of the invention as those skilled in the art readily understand. Such modifications and variations are considered to be within the scope of the invention and the appended claims.

What is claimed is:

1. A method comprising:
raster scanning a light beam on a raster scan;
modulating the light beam to illuminate display pixels on the raster scan, wherein modulating the light beam comprises driving first and second laser light sources during pixel times to produce each pixel in an image, wherein the first and second laser light sources produce light of substantially the same wavelength, and wherein the first and second laser light sources are driven at different times within one pixel time.

2. A method comprising:
raster scanning a light beam on a raster scan;
modulating the light beam to illuminate display pixels on the raster scan, wherein modulating the light beam comprises driving first and second laser light sources during pixel times to produce each pixel in an image, wherein the first and second laser light sources produce light of substantially the same wavelength, and wherein the first and second laser light sources are driven simultaneously only when a desired output power exceeds a maximum output power provided by either the first or second laser light source.

3. A method comprising:
raster scanning a light beam on a raster scan;
modulating the light beam to illuminate display pixels on the raster scan, wherein modulating the light beam comprises driving first and second laser light sources during pixel times to produce each pixel in an image, wherein the first and second laser light sources produce light of substantially the same wavelength, and wherein the first laser light source is driven to produce the one pixel during a first frame, and the second laser light source is driven to produce the one pixel during a second frame.

4. A method comprising:
raster scanning a light beam on a raster scan;
modulating the light beam to illuminate display pixels on the raster scan, wherein modulating the light beam comprises driving first and second laser light sources during pixel times to produce each pixel in an image;
determining a desired output power of one of the display pixels to be illuminated during one of the pixel times;
when the desired output power is below a threshold, driving a first laser light source during a first time period within the one of the pixel times, and driving a second laser light source during a second time period within the one of the pixel times, wherein the first and second laser light sources emit light of substantially equal wavelengths; and
when the desired output power exceeds the threshold, simultaneously driving the first and second laser light sources during the first and second time periods within the one of the pixel times.

5. The method of claim 4 wherein simultaneously driving the first and second laser light sources comprises driving the first and second laser light sources equally to produce substantially equal output power levels.

6. The method of claim 4 wherein simultaneously driving the first and second laser light sources comprises driving the first and second laser light sources unequally to produce unequal output power levels.

7. An apparatus comprising:
a scanning mirror to sweep a light beam in a raster pattern to display pixels as the light beam is modulated;
at least two laser light sources that produce light of substantially the same wavelength to contribute to the light beam; and
an image processing component to determine a desired luminance for one pixel and to drive the at least two laser light sources to produce light for the one pixel, wherein the image processing component drives the at least two laser light sources at different times within a time to display the one pixel.

8. The apparatus of claim 7 wherein the at least two laser light sources comprises at least two laser light sources to produce green light.

9. The apparatus of claim 7 wherein the at least two laser light sources comprises at least two green laser light sources, at least two blue laser light sources, and at least two red laser light sources.

10. A mobile device comprising:
an image source;
at least two sources of laser light of the same wavelength;
a scanning mirror to reflect a light beam received from the at least two sources of laser light; and
an image processing component to receive image pixel data from the image source and to determine display pixel data to drive the at least two sources of laser light to create the light beam, wherein the image processing component alternately drives the at least two sources of laser light from frame to frame.

11. The mobile device of claim 10 further comprising a wireless interface.

* * * * *